(12) United States Patent
Kim et al.

(10) Patent No.: US 11,347,400 B2
(45) Date of Patent: May 31, 2022

(54) STORAGE DEVICE FOR PROCESSING MERGED TRANSACTIONS AND METHOD OF OPERATING THE SAME

(71) Applicant: SK hynix Inc., Icheon (KR)

(72) Inventors: Do Hun Kim, Icheon (KR); Kwang Sun Lee, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/991,752

(22) Filed: Aug. 12, 2020

(65) Prior Publication Data

US 2021/0405885 A1    Dec. 30, 2021

(30) Foreign Application Priority Data

Jun. 25, 2020  (KR) .................. 10-2020-0077968

(51) Int. Cl.
| | |
|---|---|
| *G06F 12/00* | (2006.01) |
| *G06F 3/06* | (2006.01) |
| *G06F 11/10* | (2006.01) |
| *G06F 9/46* | (2006.01) |
| *G06F 9/30* | (2018.01) |

(52) U.S. Cl.
CPC .......... *G06F 3/0613* (2013.01); *G06F 3/0619* (2013.01); *G06F 3/0656* (2013.01); *G06F 3/0659* (2013.01); *G06F 3/0673* (2013.01); *G06F 9/30047* (2013.01); *G06F 9/466* (2013.01); *G06F 11/1044* (2013.01)

(58) Field of Classification Search
None
See application file for complete search history.

(56) References Cited

U.S. PATENT DOCUMENTS

| | | |
|---|---|---|
| 5,509,132 A | 4/1996 | Matsuda et al. |
| 5,604,753 A | 2/1997 | Bauer et al. |
| 6,000,006 A | 12/1999 | Bruce et al. |
| 6,324,620 B1 | 11/2001 | Christenson et al. |
| 6,330,556 B1 | 12/2001 | Chilimbi et al. |

(Continued)

FOREIGN PATENT DOCUMENTS

| | | |
|---|---|---|
| KR | 100293276 B1 | 9/2001 |
| KR | 1020070116792 A | 12/2007 |

(Continued)

OTHER PUBLICATIONS

Office Action dated Oct. 7, 2020 for related U.S. Appl. No. 16/111,044.

(Continued)

*Primary Examiner* — Daniel D Tsui

(57) ABSTRACT

The present technology relates to an electronic device. According to the present technology, a storage device having an improved operation speed may include a nonvolatile memory device, a main memory configured to temporarily store data related to controlling the nonvolatile memory device, and a memory controller configured to control the nonvolatile memory device and the main memory under control of an external host. The main memory may aggregate and process a number of write transactions having continuous addresses, among write transactions received from the memory controller, equal to a burst length unit of the main memory.

17 Claims, 14 Drawing Sheets

(56) References Cited

U.S. PATENT DOCUMENTS

| | | |
|---|---|---|
| 6,658,533 B1* | 12/2003 | Bogin ............... G06F 12/0804 711/133 |
| 8,046,551 B1 | 10/2011 | Sahin |
| 8,909,860 B2 | 12/2014 | Rao |
| 9,026,737 B1 | 5/2015 | Armangau et al. |
| 2009/0300293 A1 | 12/2009 | Mantor et al. |
| 2011/0022779 A1 | 1/2011 | Lund et al. |
| 2011/0047437 A1 | 2/2011 | Flynn |
| 2011/0072196 A1 | 3/2011 | Forhan et al. |
| 2012/0096059 A1 | 4/2012 | Shimizu et al. |
| 2012/0096217 A1 | 4/2012 | Son et al. |
| 2012/0144448 A1 | 6/2012 | Gunawardena et al. |
| 2012/0166723 A1 | 6/2012 | Araki et al. |
| 2013/0124794 A1 | 5/2013 | Bux et al. |
| 2013/0205097 A1 | 8/2013 | Flynn et al. |
| 2014/0059275 A1 | 2/2014 | Yun et al. |
| 2014/0258628 A1 | 9/2014 | Shivashankaraiah et al. |
| 2014/0281806 A1 | 9/2014 | Sharon et al. |
| 2014/0297603 A1 | 10/2014 | Kim et al. |
| 2015/0347314 A1 | 12/2015 | Lee |
| 2015/0356019 A1 | 12/2015 | Johar et al. |
| 2015/0370734 A1 | 12/2015 | Mangano et al. |
| 2016/0006461 A1 | 1/2016 | Yin et al. |
| 2016/0070472 A1 | 3/2016 | Takizawa et al. |
| 2016/0162416 A1 | 6/2016 | Boyd et al. |
| 2016/0328161 A1 | 11/2016 | Huang et al. |
| 2017/0031615 A1 | 2/2017 | Lee |
| 2017/0031626 A1 | 2/2017 | Kim et al. |
| 2017/0131951 A1 | 5/2017 | Miura |
| 2017/0242752 A1 | 8/2017 | Lee |
| 2017/0242785 A1 | 8/2017 | O'Krafka et al. |
| 2018/0004698 A1 | 1/2018 | Brouwer et al. |
| 2018/0006963 A1 | 1/2018 | Brouwer et al. |
| 2018/0130537 A1 | 5/2018 | Kim et al. |
| 2018/0253353 A1 | 9/2018 | Takase |
| 2018/0374550 A1 | 12/2018 | Barndt et al. |
| 2019/0129971 A1 | 5/2019 | Hironaka et al. |
| 2019/0340070 A1* | 11/2019 | Lien .................... G06F 11/1048 |
| 2019/0354413 A1 | 11/2019 | Bivens et al. |
| 2020/0098420 A1 | 3/2020 | Li et al. |
| 2020/0192826 A1 | 6/2020 | Ben-Simon et al. |
| 2020/0310984 A1 | 10/2020 | Choi et al. |
| 2021/0224187 A1 | 7/2021 | Um |
| 2021/0318963 A1 | 10/2021 | Kim |
| 2021/0365207 A1 | 11/2021 | Lee |
| 2021/0365372 A1 | 11/2021 | Kim |

FOREIGN PATENT DOCUMENTS

| | | |
|---|---|---|
| KR | 101014040 B1 | 2/2011 |
| KR | 1020140055737 A | 5/2014 |
| KR | 20150138713 A | 12/2015 |
| KR | 20160035737 A | 4/2016 |
| KR | 101711945 B1 | 3/2017 |
| KR | 20170070920 A | 6/2017 |
| KR | 101790165 B1 | 11/2017 |
| KR | 101858159 B1 | 6/2018 |
| KR | 20180104830 A | 9/2018 |
| KR | 20190054974 A | 5/2019 |
| KR | 101992934 B1 | 6/2019 |
| KR | 20190067088 A | 6/2019 |
| KR | 102002925 B1 | 7/2019 |
| KR | 20190082584 A | 7/2019 |
| KR | 20200095103 A | 8/2020 |

OTHER PUBLICATIONS

Office Action dated Sep. 15, 2021 for U.S. Appl. No. 17/067,412.
Non-Final Office Action for related U.S. Appl. No. 16/997,853, dated Dec. 16, 2021.
Notice of allowance dated Feb. 4, 2022 for U.S. Appl. No. 17/067,412.
Non-Final Office Action for related U.S. Appl. No. 17/196,691, dated Mar. 24, 2022.
Final Office Action for related U.S. Appl. No. 16/997,853, dated Apr. 5, 2022.

* cited by examiner

| ADDRESS | DATA |
|---|---|
| ADDR1 | MESSAGE1 |
| ADDR2 | PARITY1 |
| ADDR3 | MESSAGE2 |
| ADDR4 | PARITY2 |
| ADDR5 | MESSAGE3 |
| ADDR6 | PARITY3 |
| ADDR7 | MESSAGE4 |
| ADDR8 | PARITY4 |

503

| ADDRESS | DATA |
|---|---|
| ADDR1 | MESSAGE1+PARITY1 |
| ADDR2 | MESSAGE2+PARITY2 |
| ADDR3 | MESSAGE3+PARITY3 |
| ADDR4 | MESSAGE4+PARITY4 |

STORAGE DEVICE FOR PROCESSING MERGED TRANSACTIONS AND METHOD OF OPERATING THE SAME

CROSS-REFERENCE TO RELATED APPLICATION

The present application claims priority under 35 U.S.C. § 119(a) to Korean patent application number 10-2020-0077968, filed on Jun. 25, 2020, in the Korean Intellectual Property Office, the entire disclosure of which is incorporated herein by reference.

BACKGROUND

1. Field of Invention

The present disclosure relates to an electronic device, and more particularly, to a storage device and a method of operating the same.

2. Description of Related Art

A storage device is a device that stores data under control of a host device, such as a computer or a smartphone. A storage device may include a memory device storing data and a memory controller controlling the memory device. The memory device may be classified as a volatile memory device or a non-volatile memory device.

The volatile memory device may be a device that stores data when power is supplied and loses the stored data when the power supply is cut off. The volatile memory device may include a static random access memory (SRAM), a dynamic random access memory (DRAM), and so on.

The non-volatile memory device is a device that does not lose data when power is cut off. The non-volatile memory device may include a read only memory (ROM), a programmable ROM (PROM), an electrically programmable ROM (EPROM), an electrically erasable and programmable ROM (EEPROM), a flash memory, and so on.

In the enterprise server market, due to increasing bandwidth demands and problems of power consumption, a solid state disk (SSD) including a NAND flash memory, instead of a hard disk drive, is often utilized as a storage device. Initial SSD controllers utilized an internal memory as a data buffer. However, recent SSD controllers use a DRAM as the data buffer, due to the high speed demand. Most enterprise servers use a DRAM module, where an expensive error correction code (ECC) function is applied as a main memory of a system bus to provide data stability for the servers.

SUMMARY

An embodiment of the present disclosure provides a storage device having an improved operation speed, and a method of operating the same.

A volatile memory controller that controls a volatile memory device according to an embodiment of the present disclosure may include an error correction circuit configured to receive write transactions from an external host, wherein the write transactions store data in the volatile memory device and generate codewords used when performing error correction encoding on data corresponding to the write transactions and a data aggregator configured to generate a merged transaction in which write transactions that correspond to a burst length of the volatile memory device are merged and provide the merged transaction to the volatile memory device by performing a burst operation.

A storage device according to an embodiment of the present disclosure may include a nonvolatile memory device a main memory configured to temporarily store data related to controlling the nonvolatile memory device and a memory controller configured to control the nonvolatile memory device and the main memory under control of an external host, wherein the main memory aggregates and processes a number of write transactions having continuous addresses, among write transactions received from the memory controller, equal to a burst length unit of the main memory.

According to the present technology, a storage device having an improved operation speed, and a method of operating the same are provided.

BRIEF DESCRIPTION OF THE DRAWINGS

FIG. 5 illustrates an address mapping method for storing parity data.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Figure 1:
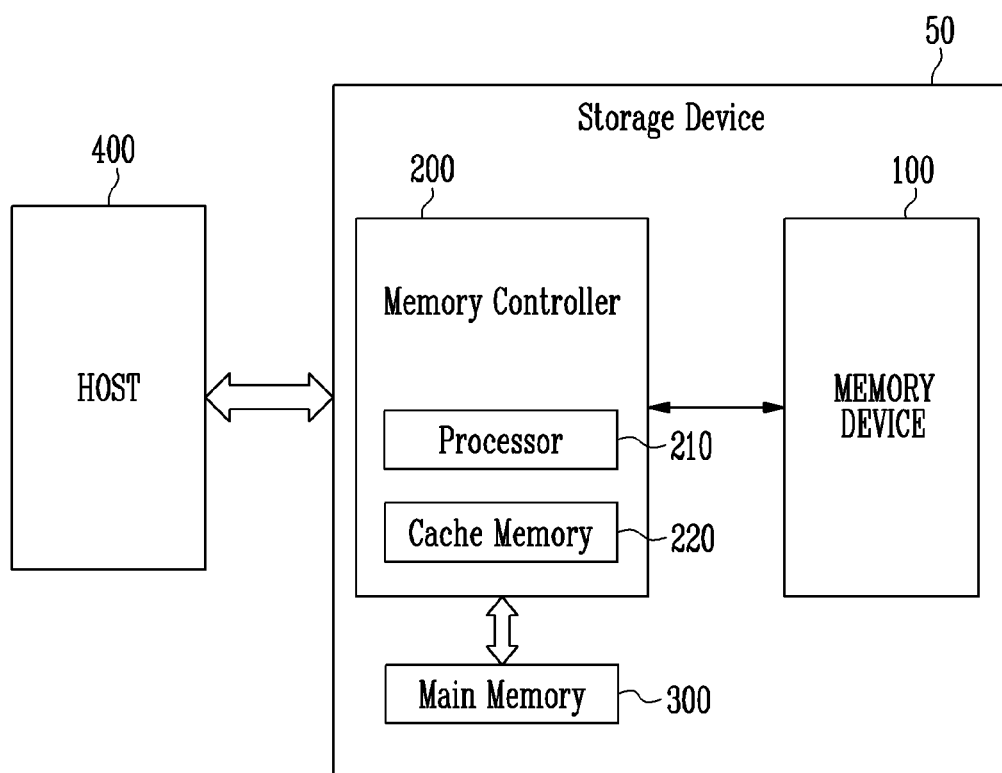
FIG. 1 illustrates a storage device according to an embodiment of the present disclosure.

FIG. 1 illustrates a storage device according to an embodiment of the present disclosure.

Referring to FIG. 1, the storage device 50 may include a memory device 100 and a memory controller 200 that controls an operation of the memory device 100. The storage device 50 may be a device that stores data under control of a host 400, such as a cellular phone, a smartphone or other mobile device, an MP3 player, a laptop computer, a desktop computer, a game player or gaming system, a TV, a tablet PC, an in-vehicle infotainment system, and so on.

The storage device 50 may be manufactured as one of various types of storage devices that communicate with the host 400 via a host interface. For example, the storage device 50 may be configured as any one of various types of storage devices, such as an SSD, a multimedia card in a form of a MMC (MultiMediaCard), an eMMC (embedded MMC), an RS-MMC (Reduced Size MMC) and a micro-MMC, a secure digital card in a form of an SD, a mini-SD and/or a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any one of various types of packages. For example, the storage device 50 may be manufactured as any one of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits.

The memory cell array (not shown) may include a plurality of memory blocks. One memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), a spin transfer torque random access memory (STT-RAM), and so on. In the present specification, for convenience of description, the memory device 100 may be a NAND flash memory.

The memory device 100 is configured to receive a command CMD and an address ADDR from the memory controller 200 and access an area selected by an address in the memory cell array. The memory device 100 may perform an operation instructed by the command CMD on the area identified or referenced by the address ADDR. For example, the memory device 100 may perform a write operation (e.g., a program operation), a read operation, and/or an erase operation. During the program operation, the memory device 100 may program data in the area identified by the address ADDR. During the read operation, the memory device 100 may read data from the area identified by the address ADDR. During the erase operation, the memory device 100 may erase data stored in the area identified by the address ADDR.

The memory controller 200 may control an overall operation of the storage device 50. In an embodiment, the memory controller 200 is a digital circuit that manages the flow of data going to and from the memory device 100. The memory controller 200 may be formed on a chip independently or integrated with one or more other circuits.

When power is applied to the storage device 50, the memory controller 200 may execute firmware (FW). When the memory device 100 is a flash memory device, the firmware (FW) may include a host interface layer (HIL) that controls communication with the host 400, a flash translation layer (FTL) that controls communication between the memory controller 200 and the host 400, and a flash interface layer (FIL) that controls communication with the memory device 100.

In an embodiment, the memory controller 200 may receive data and a logical block address (LBA) from the host 400 and may convert the LBA into a physical block address (PBA), which indicates an address of memory cells in which data included in the memory device 100 is to be stored. In the present specification, the LBA and a "logic address" or a "logical address" may be used interchangeably. In the present specification, the PBA and a "physical address" may be used interchangeably.

The memory controller 200 may control the memory device 100 to perform the program operation, the read operation, and/or the erase operation according to a request provided by the host 400. During the program operation, the memory controller 200 may provide a write command, the PBA, and data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate a command, an address, and data independently or without receiving a request from the host 400. The memory controller 200 may transmit the command, the address, and/or the data to the memory device 100. For example, the memory controller 200 may provide a command, an address, and/or data for performing a read operation and associated program, such as wear leveling, read reclaim, garbage collection, and so on, to the memory device 100.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100, where the performance of the operations overlap with each other.

The main memory 300 may temporarily store data received from the host 400 or may temporarily store data received from the memory device 100. The main memory 300 may operate under control of the host 400. In an embodiment, the main memory 300 may be a volatile memory device. For example, the main memory 300 may be a dynamic random access memory (DRAM) or a static random access memory (SRAM).

The main memory 300 may provide data to the memory device 100 according to a request provided by or received from the memory controller 200, or may provide data to the host 400. In an embodiment, the main memory 300 may provide data to the memory controller 200 and/or store data received from the memory controller 200.

The main memory 300 may perform an encoding operation and/or a decoding operation using an error correction code to detect or correct an error bit included in the stored data.

In an embodiment, the memory controller 200 may read metadata stored in the memory device 100 and store the read metadata in the main memory 300.

The metadata may be data including various information required or used to control the storage device 50. For example, the metadata may include bad block information, which is information on a bad block or bad blocks among a plurality of memory blocks included in the memory device 100, and firmware to be executed by a processor 210 of the memory controller 200.

In an embodiment, the metadata may include map data, which indicates or contains a correspondence or relationship between the logical address provided by the host 400 and the physical address of the memory cells included in the memory device 100. Further, the metadata may include a valid page table, which indicates whether data stored in pages included in the memory device 100 is valid data. In an embodiment, the valid page table data may include a plurality of valid page tables. The valid page table may be data of a bitmap form indicating whether data stored in a page in a 4 KB unit is valid.

Alternatively, in various embodiments, the metadata may include read count data indicating the number of instances of read operations performed on the memory blocks included in the memory device 100, cycling data indicating the number of instances of erasures of the memory blocks included in the memory device 100, hot/cold data indicating whether the data stored in the pages included in the memory device 100 is hot data or cold data, and/or journal data indicating changes to the contents of the map data.

In an embodiment, the metadata stored in the main memory 300 may include data chunks having different types of data structures for each type. For example, the metadata may have different data sizes for each type. Therefore, the size of the metadata stored in the main memory 300 may be different for each type.

In an embodiment of the present disclosure, the memory controller 200 may include the processor 210 and a cache memory 220.

The processor 210 may control an overall operation of the memory controller 200. The processor 210 may control the main memory 300 to read the data stored in the main memory 300, change the data, and then store the data back in the main memory 300.

The processor 210 may execute firmware (FW). The processor 210 may perform operations required or used to access the memory device 100. For example, the processor 210 may provide a command to the memory device 100 and control the memory device 100 and the main memory 300 to perform an operation corresponding to or based on the command.

For example, when a write request is received from the host 400, the processor 210 may convert a logical address corresponding to the write request into a physical address. The processor 210 may store the map data, which is the correspondence or relationship between the logical address and the physical address, in the main memory 300.

In order to store the map data, the processor 210 may read a map segment that includes mapping information of the logical address provided by the host 400 from the main memory 300. Thereafter, the processor 210 may record the physical address corresponding to the logical address in the map segment. The processor 210 may store the map segment that recorded the physical address back in the main memory 300. When the physical address is allocated, the data of the valid page table corresponding to an associated physical address may also be updated.

In an embodiment, the map data stored in the main memory 300 may be updated. For example, when a write request of new data is input with respect to a previously write requested logical address, previously stored data may become invalid data, and a physical address corresponding to the logical address may be changed. Alternatively, when stored data is changed by various background operations, such as garbage collection, read reclaim, and/or wear leveling, the map data may be updated.

The cache memory 220 may store data accessed by the processor 210 from the main memory 300. A capacity of the cache memory 220 may be smaller than that of the main memory 300. In an embodiment, the cache memory 220 may be a volatile memory device. For example, the main memory 300 may be a dynamic random access memory (DRAM) or a static random access memory (SRAM). The cache memory 220 may be a memory having an operation speed faster than that of the main memory 300.

Because the capacity of the cache memory 220 is smaller than that of the main memory 300, the cache memory 220 may store only metadata accessed by the processor 210, with respect to all the metadata stored in the main memory 300. The storing of data associated with a specific address, with respect to all the data stored in the main memory 300, in the cache memory 220 is referred to as caching.

When the cache memory 220 stores data to be accessed by the processor 210 from the main memory 300, the cache memory 220 may provide the data to the processor 210. Since the operation speed of the cache memory 220 is faster than that of the main memory 300, when the data to be accessed by the processor 210 is stored in the cache memory 220, the processor 210 may obtain the data faster than instead obtaining the data from the main memory 300.

A cache hit occurs when data to be accessed by the processor 210 is stored in the cache memory 220, and a cache miss occurs when data to be accessed by the processor 210 is not stored in the cache memory 220. When cache hits increase for the cache memory 220, the speed of an operation processed by the processor 210 may also increase.

A method of operating the cache memory 220 may be classified or called a direct mapped cache, a set associative cache, and/or a fully associative cache.

The direct mapped cache method of operation may be a method in which a plurality of addresses of the main memory 300 operate in a many-to-one (n:1) method corresponding to one address of the cache memory 220. That is, the direct mapped cache method of operation may be an operation method having an address of the cache memory (not shown) in which data that is stored in a specific address of the main memory 300 may be cached is mapped and fixed in advance.

The fully associative cache may be a method of operation in which the address of the cache memory (not shown) and the address of the main memory 300 are not fixedly mapped and the address of an empty cache memory (not shown) may cache data stored in any address of the main memory 300. The fully associative cache is required or used to search all addresses when determining the occurrence of a cache hit or cache miss.

The set associative cache method of operation is an intermediate form of the direct mapped cache and the fully associative cache, and manages the cache memory (not shown) by dividing the cache memory (not shown) into a plurality of cache sets. The cache set may be divided into cache ways or a cache line that are also managed.

The host 400 may communicate with the storage device 50 using at least one of various communication methods or protocols, such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and/or a load reduced DIMM (LRDIMM).

Figure 2:
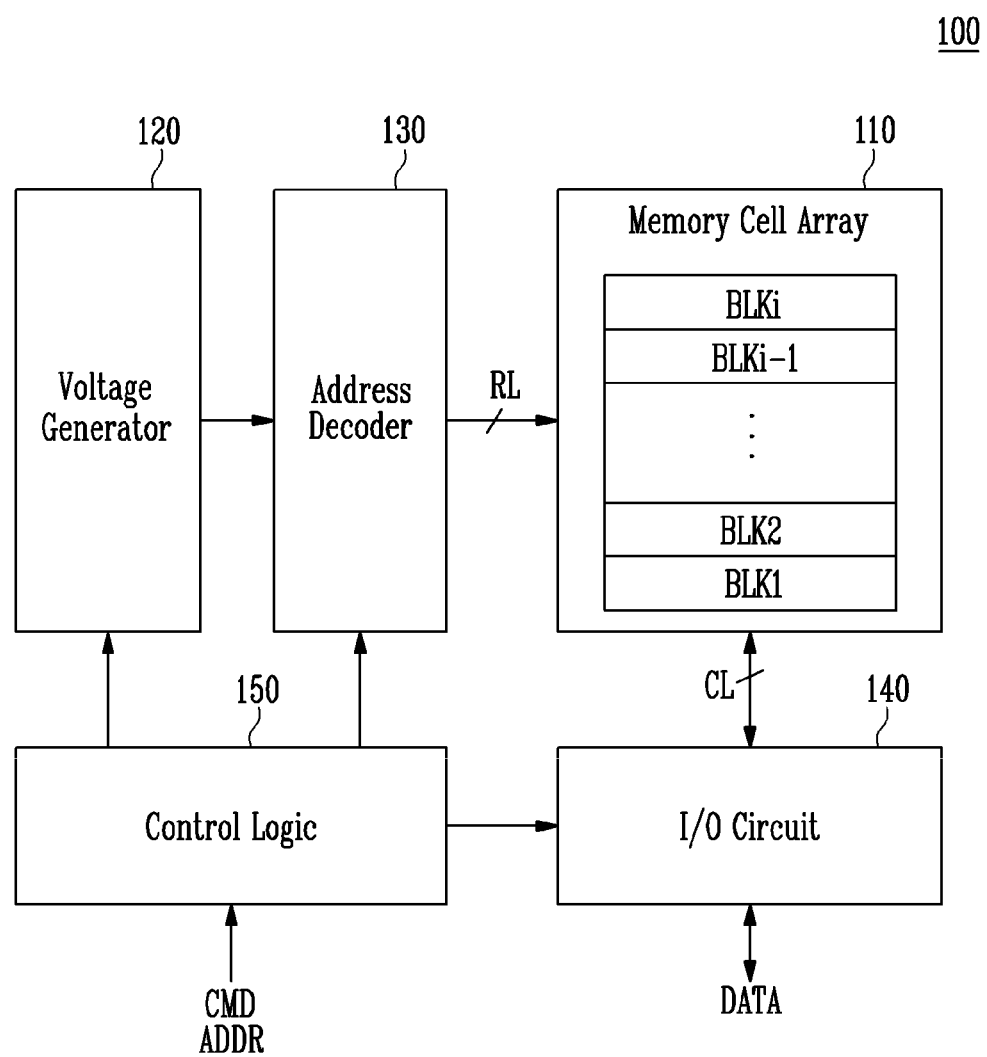
FIG. 2 illustrates a memory device of FIG. 1.

FIG. 2 illustrates the memory device 100 of FIG. 1.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

Each of the plurality of memory blocks BLK1 to BLKi includes a plurality of memory cells. In an embodiment, the plurality of memory cells may be non-volatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and/or the erase operation.

The voltage generator 120 is configured to generate a plurality of operation voltages Vop using an external power voltage supplied to the memory device 100. The voltage generator 120 operates in response to the control of the control logic 150.

As an embodiment, the voltage generator 120 may generate an internal power voltage by regulating the external power voltage. The internal power voltage generated by the voltage generator 120 is used as an operation voltage of the memory device 100.

As an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and/or a plurality of unselected read voltages.

The voltage generator 120 may include a plurality of pumping capacitors that receive the internal power voltage to generate the plurality of operation voltages having various voltage levels and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address or addresses ADDR from the control logic 150. The address decoder 130 may decode a block address among the received addresses ADDR. The address decoder 130 selects at least one memory block of the memory blocks BLK1 to BLKi according to or based on the decoded block address. The address decoder 130 may decode a row address from the received addresses ADDR. The address decoder 130 may select at least one word line among the word lines of a selected memory block according to or based on the decoded row address. In an embodiment, the address decoder 130 may decode a column address from the received addresses ADDR. The address decoder 130 may connect the input/output circuit 140 and the memory cell array 110 to each other according to or based on the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD received from and/or transmitted by an external device. The control logic 150 may generate various signals in response to the command CMD and the address ADDR to control the peripheral circuits.

Figure 3:
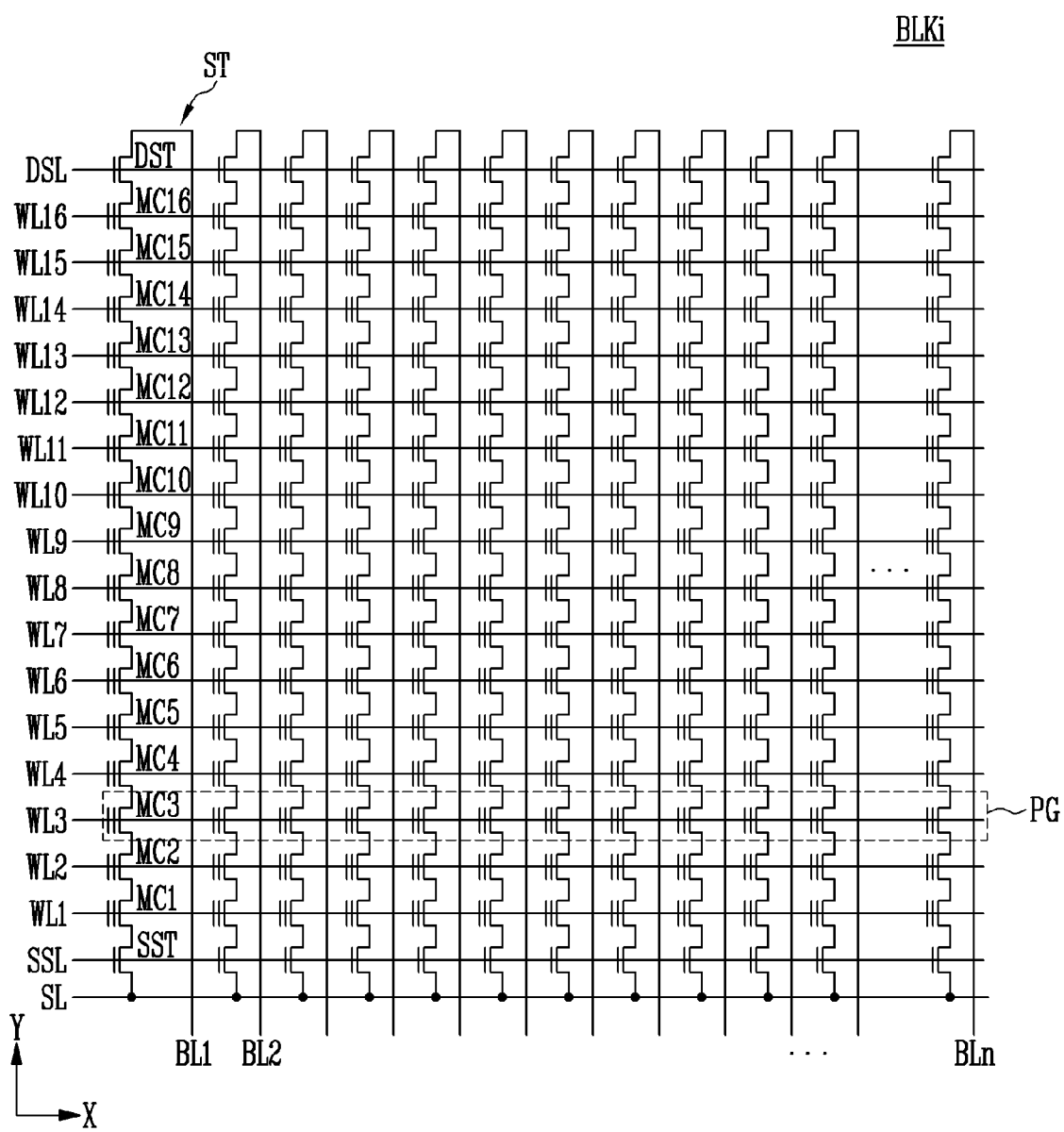
FIG. 3 illustrates a configuration of any one of the memory blocks of FIG. 2.

FIG. 3 illustrates a configuration of any one of the memory blocks of FIG. 2.

The memory block BLKi is any one BLKi of the memory blocks BLK1 to BLKi of FIG. 2.

Referring to FIG. 3, a plurality of word lines arranged in parallel with each other may be connected between a first select line and a second select line. As shown, the first select line may be the source select line SSL, and the second select line may be the drain select line DSL. More specifically, the memory block may include a plurality of strings ST connected between the bit lines BL1 to BLn and the source line SL. The bit lines BL1 to BLn may be connected to the strings ST, respectively, and the source line SL may be connected to the strings ST. Because the strings ST may be configured to be identical to each other, a string ST connected to the first bit line BL1 will now be specifically described, as an example.

The string ST may include a source select transistor SST, a plurality of memory cells MC1 to MC16, and a drain select transistor DST connected in series between the source line SL and the first bit line BL1. One string ST may include at least one or more of the source select transistor SST and the drain select transistor DST, and may include the memory cells MC1 to MC16, and/or additional memory cells not shown in the figure.

A source of the source select transistor SST may be connected to the source line SL and a drain of the drain select transistor DST may be connected to the first bit line BL1. The memory cells MC1 to MC16 may be connected in series between the source select transistor SST and the drain select transistor DST. Gates of the source select transistors SST included in the different strings ST may be connected to the source select line SSL, gates of the drain select transistors DST may be connected to the drain select line DSL, and gates of the memory cells MC1 to MC16 may be connected to the plurality of word lines WL1 to WL16. A group of the memory cells connected to the same word line among the memory cells included in different strings ST may be referred to as a page PG. Therefore, the memory block BLKi may include pages PG equal to the number of the word lines WL1 to WL16.

One memory cell may store one bit of data. This is generally called a single level cell (SLC). In this case, one physical page PG may store one logical page (LPG) data. The one logical page (LPG) data may include data bits equal in number as the cells included in one physical page PG.

The one memory cell may store two or more bits of data. In this case, one physical page PG may store two or more logical page (LPG) data.

Figure 4:
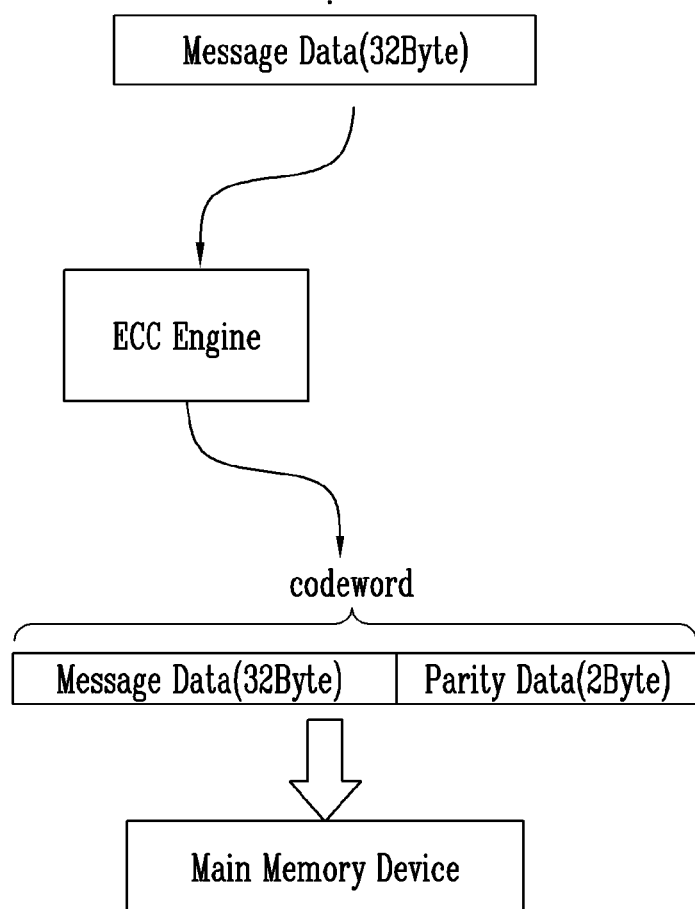
FIG. 4 illustrates an error correction encoding operation performed when data is stored in a main memory device.

FIG. 4 illustrates an error correction encoding operation performed when data is stored in a main memory device.

Referring to FIG. 4, the main memory may receive data to be stored from the memory device 100, the memory controller 200, and/or the host 400, as described with reference to FIG. 1. The data to be stored in the main memory may be write data requested by the host 400 to be stored in the memory device 100, read data read from the memory device 100, and/or data requested by the memory controller 200 to be stored in the main memory.

The data received by the main memory may be message data (Message Data). In an embodiment, the message data (Message Data) may have a size of 32 bytes.

The main memory may include its own error correction code engine (ECC engine) for detection and correction of an error bit of the data to be stored. In an embodiment, an error correction code used by the ECC engine may be BCH (Bose-Chaudhuri-Hocquenghem), Reed Solomon, Hamming code, low density parity check code (LDPC), redundant array of independent disks (RAID), cyclic redundancy check (CRC), and so on.

The ECC engine may encode the message data (Message Data) using the error correction code. A codeword may be generated as a result of the encoding operation on the message data (Message Data). The codeword may include the message data (Message Data) and parity data (Parity Data). The main memory may store the codeword in a main memory device (Main Memory Device).

In order to store the parity data (Parity Data) in the main memory device, the main memory may use an address mapping method, including separate mode mapping and/or continuous mode mapping.

FIG. 5 illustrates describing the address mapping methods for storing the parity data.

Referring to FIG. 5, the main memory may use the separate mode mapping or the continuous mode mapping methods to store the parity data (Parity Data) in the main memory device.

The separate mode mapping may be a mapping method in which message data and the parity data have different base addresses.

A first mapping table 501 may include mapping information containing addresses, to which the message data and the parity data are to be stored, are allocated according to the separate mode mapping. According to the separate mode mapping method, an additional transaction that performs a separate write or read operation may be required or utilized to store or read the parity data. Further, a transaction may be an access unit that stores data in the main memory or reads data from the main memory.

The continuous mode mapping may be a mapping method in which the message data and the parity data have the same base address or continuous addresses.

A second mapping table 503 may include mapping information containing an address, in which the message data and the parity data are to be stored, is allocated according to the continuous mode mapping. According to the continuous mode mapping method, the message data and the parity data may have the same base address and may be accessed by one transaction. Alternatively, because the message data and the parity data have the continuous addresses, the message data and the parity data may be processed together using a burst operation. Therefore, an additional transaction for access of the parity data may not occur or be performed.

Therefore, storing the parity data according to the continuous mode mapping method instead of the separate mode mapping method does not use or require an additional transaction. Thus, storing the parity data using the continuous mode mapping method may increase the operational efficiency of a memory.

However, in a case of the continuous mode mapping method, because the parity data is transmitted immediately after the message data, address alignment may be broken. Although the method performs a single continuous transaction, the single continuous transaction may be processed as separate internal transactions, a transaction for the message data and a transaction for the parity data.

Therefore, when the ECC engine is used, the continuous mode mapping method may be more efficient than the separate mode mapping method, but the efficiency may be reduced when the ECC engine is not used.

In an embodiment of the present disclosure, when the ECC engine is used, a data aggregator is provided to improve a memory efficiency reduction, and a method of improving the memory efficiency reduction is performed.

Figure 6:
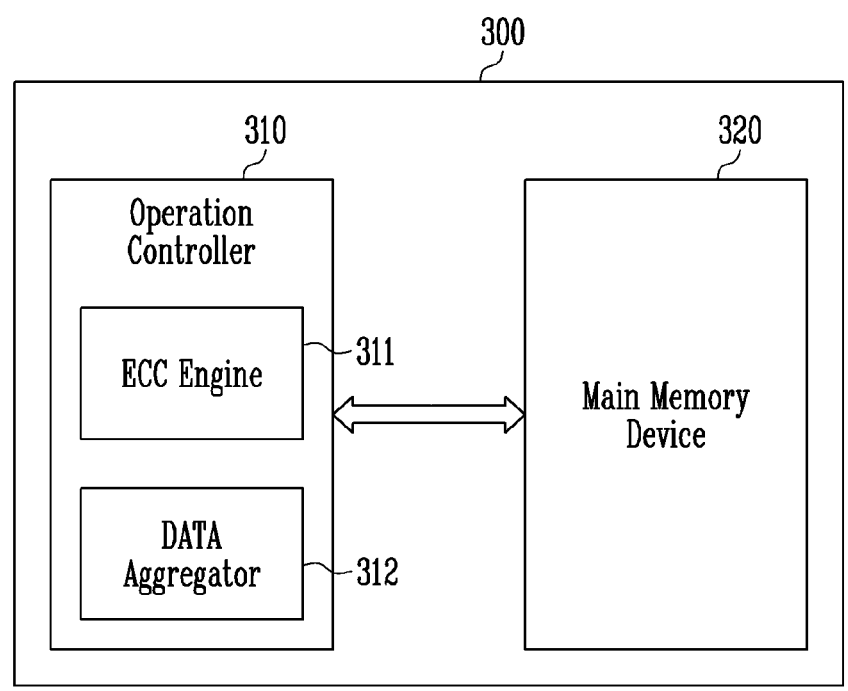
FIG. 6 illustrates an operation of a main memory according to an embodiment of the present disclosure.

FIG. 6 illustrates an operation of the main memory according to an embodiment of the present disclosure.

Referring to FIG. 6, the main memory 300 may include an operation controller 310 and a main memory device 320. In an embodiment, the operation controller 310 may be a DRAM controller (volatile memory controller), and the main memory device 320 may be a DRAM (volatile memory device).

The operation controller 310 may include an ECC engine 311 and a data aggregator 312.

The ECC engine 311 may receive data to be stored in the main memory device 320 from the memory device 100, the memory controller 200, and/or the host 400, as described with reference to FIG. 1. In an embodiment, the data to be stored in the main memory device 320 may include write data requested by the host 400 to be stored in the memory device 100, read data read from the memory device 100, and/or data requested by the memory controller 200 to be stored in the main memory.

The ECC engine 311 may encode the received data using the error correction code. The error correction code used by the ECC engine 311 may be BCH, Reed Solomon, Hamming code, low density parity check code (LDPC), redundant array of independent disks (RAID), cyclic redundancy check (CRC), and so on The ECC engine 311 may provide the codeword to the data aggregator 312.

The data aggregator 312 may receive the codeword from the ECC engine 311. The data aggregator 312 may provide a write completion response to the ECC engine in response to the received codeword. The write complete response may be a response indicating that the codeword is successfully stored in the main memory device 320. The ECC engine 311 may provide the received write completion response to the memory device 100, the memory controller 200, and/or the host 400 that provides the data to be stored.

The main memory device 320 may perform the burst operation, as described herein. Here, the burst operation refers to an operation in which the main memory device 320 writes or reads a large amount of data by sequentially decreasing or increasing an address from an initial address received from the data aggregator 312. A basic unit of the burst operation is referred to as a burst length (BL). In an embodiment, the BL may be the number of continuous read or write operations by increasing or decreasing the address from the initial address. For example, in a case where the main memory device 320 is a double data rate (DDR) DRAM, when the BL is 8 (BL=8), the burst read operation or write operation is performed eight times continuously from the initial address in response to a clock (CLK).

The BL may be determined by a user. That is, the data aggregator 312 may set the BL under control of the host 400. Further, the main memory 300 may further include a global register (not shown) that stores information on or about the BL. In an embodiment, the main memory device 320 may include a plurality of storage areas. For example, the main memory device 320 may include a plurality of banks. In this case, the BL may be set differently or uniquely for each of the plurality of storage areas.

In an embodiment, the data aggregator 312 may temporarily store the received codewords without providing the codewords to the main memory device 320 until a predetermined size is reached. Alternatively, the data aggregator 312 may temporarily store the received codewords without providing the codewords to the main memory device 320 until a predetermined number of write transactions are collected. In an embodiment, the predetermined size may be a data size corresponding to the BL of the main memory device 320. Alternatively, the predetermined number of write transactions may be the BL.

Figure 7:
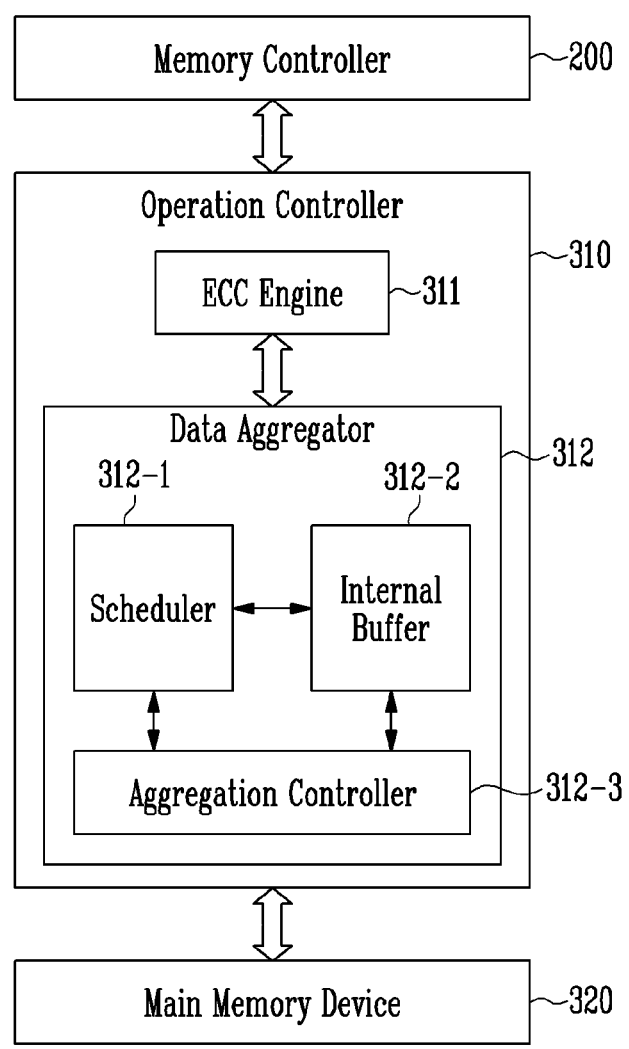
FIG. 7 illustrates an operation of the storage device according to an embodiment of the present disclosure.

FIG. 7 illustrates an operation of the storage device according to an embodiment of the present disclosure.

Referring to FIG. 7, the memory controller 200 may provide the data, which is to be stored in the main memory device 320, to the operation controller 310.

The operation controller 310 may include the ECC engine 311 and the data aggregator 312.

The data aggregator 312 may include a scheduler 312-1, an internal buffer 312-2, and an aggregation controller 312-3.

The ECC engine 311 may generate the codeword obtained by encoding the data to be stored using the error correction code, as described herein. In an embodiment, the codeword may include the message data (e.g., original data), and the parity data corresponding to the error correction code. The ECC engine 311 may provide the codeword to the data aggregator 312.

The data aggregator 312 may control the main memory device 320 to perform a write operation of storing data in the main memory device 320 or a read operation of reading data from the main memory device 320. The main memory device 320 may operate using transactions. That is, the data aggregator 312 may provide a write transaction (e.g., a request to perform a write operation) or a read transaction (e.g., a request to perform a read operation) to the main memory device 320.

The scheduler 312-1 may operate in response to control of the aggregation controller 312-3. For example, the write transaction provided from the ECC engine 311 may be stored in a provided sequence under control of the scheduler 312-1.

The internal buffer 312-2 may store the codeword corresponding to the write transaction under the control of the aggregation controller 312-3.

The aggregation controller 312-3 may receive the codeword from the ECC engine 311. The aggregation controller 312-3 may store the codeword in the internal buffer 312-2 and provide a write completion response to the ECC engine 311. The aggregation controller 312-3 may store the write transaction in the scheduler 312-1. The write transaction may include information on a write address corresponding to the codeword to be stored.

When the codewords stored in the internal buffer 312-2 reach a predetermined size, the aggregation controller 312-3 may generate a merged transaction, in which the write transactions corresponding to or associated with the stored codewords are merged, and provide the generated merged transaction to the main memory device 320.

Alternatively, when the predetermined number of write transactions are stored in the scheduler 312-1, the aggregation controller 312-3 may generate the merged transaction, in which the stored write transactions are merged, and provide the generated merged transaction to the main memory device 320. Addresses corresponding to the write transactions included in the merged transaction may be continuous addresses. In an embodiment, the predetermined size may be a data size corresponding to the burst length of the main memory device 320. Alternatively, the predetermined number of write transactions may be the burst length.

Figure 8:
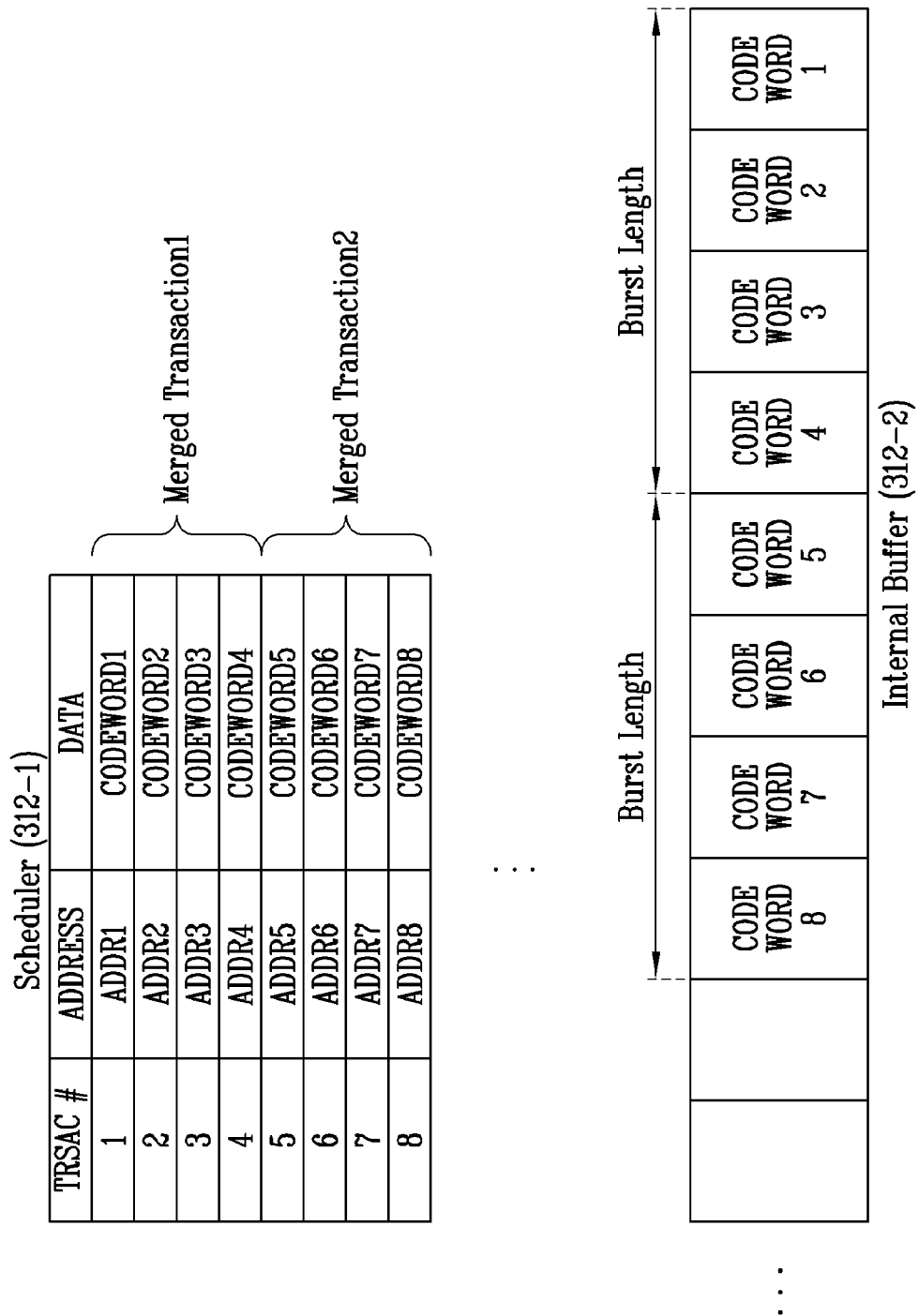
FIG. 8 illustrates an operation of a scheduler and an internal buffer described with reference to FIG. 7.

FIG. 8 illustrates an operation of the scheduler and the internal buffer described with reference to FIG. 7.

Referring to FIGS. 7 and 8, the scheduler 312-1 may store the input write transaction according to or based on an input sequence. In FIG. 8, the burst length is assumed or pre-selected to be four.

In FIG. 8, the scheduler 312-1 stores first to eighth write transactions (e.g., TRSAC). The internal buffer 312-2 may store a first codeword CODEWORD1 to an eighth codeword CODEWORD8, which correspond to a first write transaction to an eighth write transaction.

A first merged transaction (Merged Transaction1) may include the first to fourth write transactions. A second merged transaction (Merged Transaction2) may include the fifth to eighth write transactions.

Write transactions that may be merged into a merged transaction may have continuous addresses. For example, the first to fourth write transactions have continuous addresses, first address ADDR1 to fourth address ADDR4, respectively, and the fifth to eighth write transactions have continuous addresses, fifth address ADDR5 to eighth address ADDR8, respectively.

Since the burst length of the merged transaction is four, the merged transaction may be generated when four write transactions are stored in the scheduler 312-1. Alternatively, the merged transaction may receive write transactions for a predetermined time, and then may be generated in a lump.

Because all of the first to eighth write transactions in FIG. 8 are write transactions in which addresses are continuous, a merged transaction that merges any four write transactions may be generated, including merged transactions not shown in FIG. 8. For example, a merged transaction may include the first write transaction, the third write transaction, the fourth write transaction, and the seventh write transaction.

The aggregation controller 312-3 described with reference to FIG. 7 may provide the merged transaction to the main memory device 320 according to the burst operation.

Figure 9:
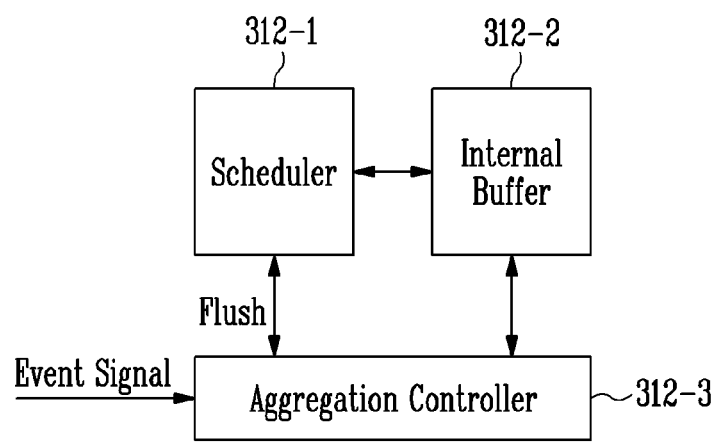
FIG. 9 illustrates an operation of a data aggregator when a merged transaction is not generated.

FIG. 9 illustrates an operation of the data aggregator when a merged transaction is not generated.

Referring to FIG. 9, the aggregation controller 312-3 may control the scheduler 312-1 and the internal buffer 312-2 to perform a flush operation of providing the write transaction stored in the scheduler 312-1 to the main memory device 320 without generating a merged transaction.

For example, the aggregation controller 312-3 may control the scheduler 312-1 and the internal buffer 312-2 to perform the flush operation in response to an event signal generated in the main memory 300. Here, the event signal may be generated when the continuity of the addresses of the write transactions is broken, a read transaction for the same address as the address of the write transaction stored in the scheduler 312-1 is received, and/or a forced flush request is received from the memory controller 200. In an embodiment, the forced flush request may be input when an emergency situation occurs, such as a sleep mode that reduces power consumption of the storage device 50 or a sudden power of the storage device 50 off occurs.

Specifically, when the addresses of the write transactions stored in the scheduler 312-1 are not continuous (e.g., the continuity of the addresses of the write transactions is broken), the aggregation controller 312-3 may provide each write transaction to the main memory device 320 without generating a merged transaction. For example, when a write transaction having an address that is not continuous with the address of the write transactions stored in the scheduler 312-1 is provided, the aggregation controller 312-3 may provide each write transaction to the main memory device 320 without generating a merged transaction.

Alternatively, before generating the merged transaction, when the address for the read transaction is the same address as the address of the write transaction stored in the scheduler 312-1 is received, in order to avoid a data hazard, the aggregation controller 312-3 may provide each write transaction to the main memory device 320 without generating a merged transaction. The aggregation controller 312-3 may provide a read transaction to the main memory device 320 after completion of the write transaction.

Alternatively, the aggregation controller 312-3 may provide each write transaction to the main memory device 320 without generating a merged transaction in response to the forced flush input, which is input from the outside of the device.

In an embodiment, when the write transactions corresponding to the burst length are stored in the scheduler 312-1, the aggregation controller 312-3 may generate a merged transaction, provide the merged transaction to the main memory device 320, and then store newly input write transactions in the scheduler 312-1.

Figure 10:
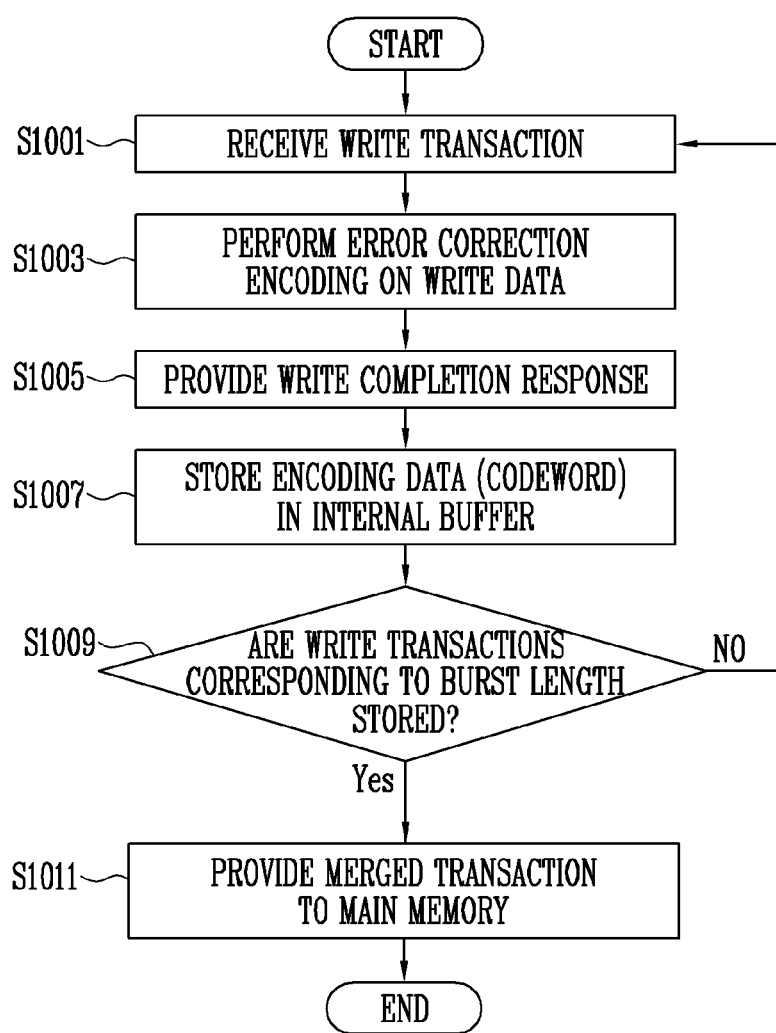
FIG. 10 illustrates an operation of a main memory included in the storage device according to an embodiment of the present disclosure.

FIG. 10 illustrates an operation of a main memory included in the storage device according to an embodiment of the present disclosure.

Referring to FIG. 10, in step S1001, the main memory may receive the write transaction. The write transaction may be input from any one of the memory controller 200, the memory device 100, and/or the host 400, as described with reference to FIG. 1.

In step S1003, the main memory may perform error correction encoding on the write data, which is data corresponding to or associated with the write transaction.

In step S1005, the main memory may first provide the write completion response to the memory controller 200 that provides the write transaction.

In step S1007, the main memory stores the codeword, which is encoded data, in the internal buffer.

In step S1009, the main memory may determine whether the write transactions corresponding to the burst length are stored in the internal buffer. When the write transactions corresponding to the burst length are not stored, the operation returns to step S1001. When the write transactions corresponding to the burst length are stored, the operation proceeds to Step S1011.

In step S1011, the main memory may generate the merged transaction, in which the write transactions are merged, and provide the merged transaction to the main memory to store data in the main memory device. Here, the write transactions included in the merged transaction may be the write transactions with the continuous addresses.

Figure 11:
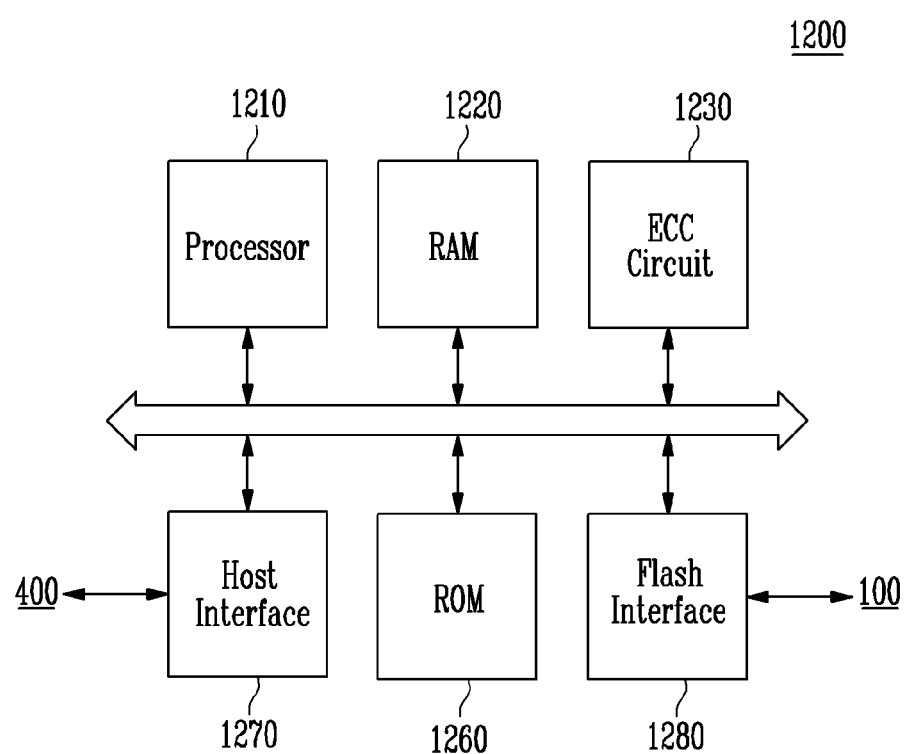
FIG. 11 illustrates another embodiment of the memory controller of FIG. 1.

FIG. 11 illustrates another embodiment of the memory controller of FIG. 1.

Referring to FIGS. 1 and 11, the memory controller 1200 may include a processor 1210, a RAM 1220, an error correction circuit 1230, a ROM 1260, a host interface 1270, and a flash interface 1280.

The processor 1210 may control overall operations of the memory controller 1200. The RAM 1220 may be used as a buffer memory, a cache memory, and an operation memory of the memory controller 1200. For example, the cache memory 220, described with reference to FIG. 1, may be the RAM 1220, and may be an SRAM in an embodiment.

The ROM 1260 may store various information required for the memory controller 1200 to operate in a firmware form.

The memory controller 1200 may communicate with an external device (for example, the host 400, an application processor, and the like) through the host interface 1270.

The memory controller 1200 may communicate with the memory device 100 through the flash interface 1280. The memory controller 1200 may transmit a command CMD, an address ADDR, and a control signal CTRL to the memory device 100 through the flash interface 1280 and receive data DATA. For example, the flash interface 1280 may include a NAND interface.

Figure 12:
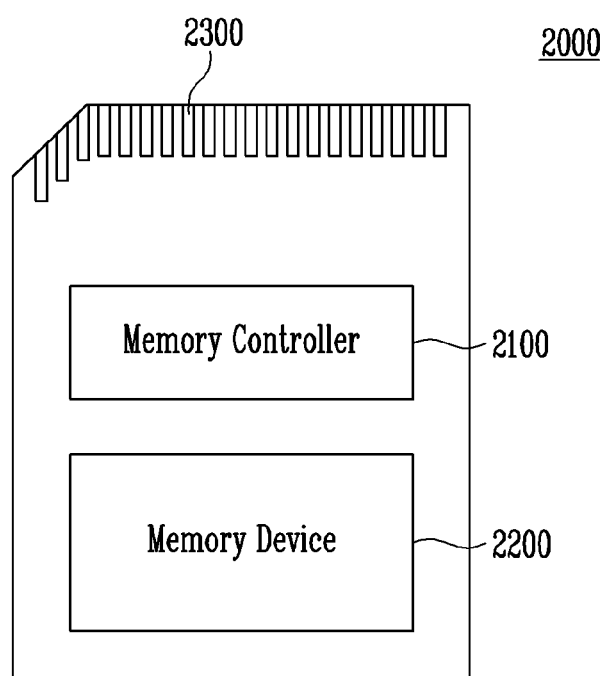
FIG. 12 illustrates a memory card system where the storage device according to an embodiment of the present disclosure is applied.

FIG. 12 illustrates a memory card system to which the storage device according to an embodiment of the present disclosure is applied.

Referring to FIG. 12, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host.

The memory controller 2100 is configured to drive firmware for controlling the memory device 2200. The memory controller 2100 may be implemented as the memory controller 200 described with reference to FIG. 1.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (e.g., the host) according to a specific communication standard or protocol. For example, the memory controller 2100 is configured to communicate with an external device through at least one of various communication standards such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards described above.

For example, the memory device 2200 may be configured of various non-volatile memory elements, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-transfer-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash (CF) card, a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 13:
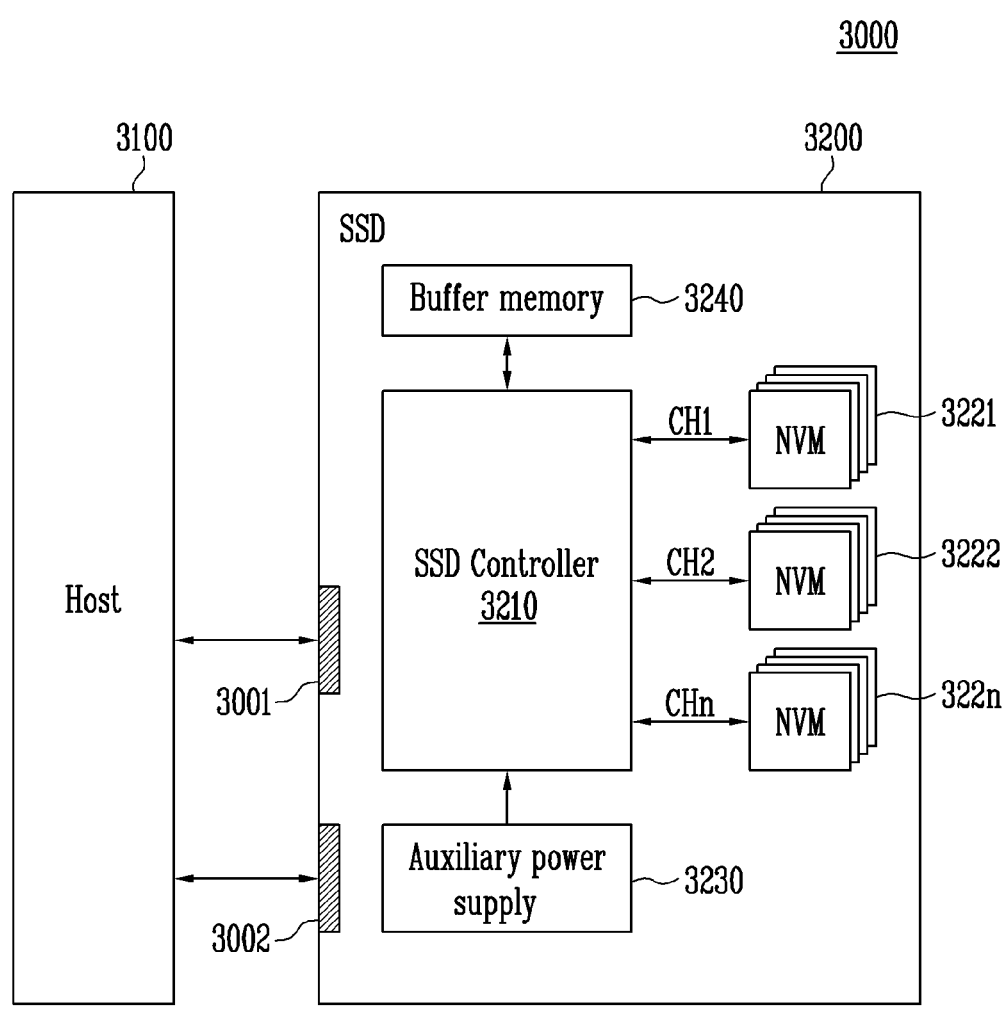
FIG. 13 illustrates a solid state drive (SSD) system where the storage device according to an embodiment of the present disclosure is applied.

FIG. 13 illustrates a solid state drive (SSD) system to which the storage device according to an embodiment of the present disclosure is applied.

Referring to FIG. 13, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200, as described with reference to FIG. 1.

The SSD controller 3210 may control the plurality of flash memories 3221 to 322n in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC ((eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power PWR from the host 3100 and may charge the power. The auxiliary power supply 3230 may provide power of the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n or may temporarily store meta data (example e.g., a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 14:
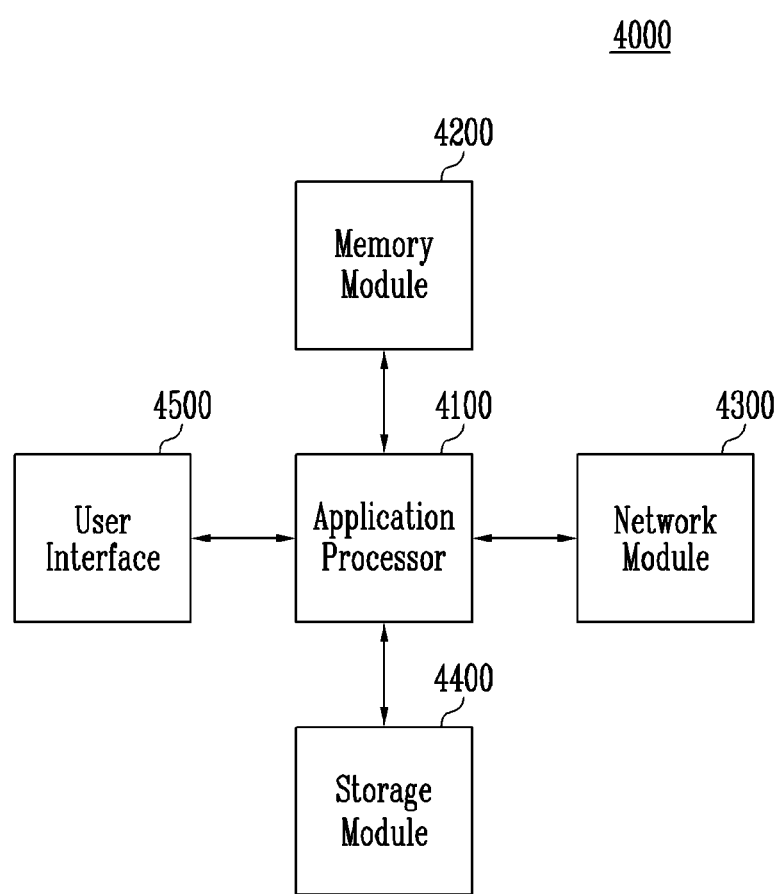
FIG. 14 illustrates a user system where the storage device according to an embodiment of the present disclosure is applied.

FIG. 14 illustrates a user system to which the storage device according to an embodiment of the present disclosure is applied.

Referring to FIG. 14, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and so on, which control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A volatile memory controller that controls a volatile memory device, the volatile memory controller comprising:
   an error correction circuit configured to:
   receive write transactions from an external host, wherein the write transactions store data in the volatile memory device; and
   generate codewords used when performing error correction encoding on data corresponding to the write transactions; and
   a data aggregator configured to:
   generate a merged transaction in which write transactions that correspond to a burst length of the volatile memory device are merged; and
   provide the merged transaction to the volatile memory device by performing a burst operation,
   wherein the burst operation is an operation of storing data while sequentially decreasing or increasing an address of any one of the write transactions included in the merged transaction.

2. The volatile memory controller of claim 1, wherein the data aggregator comprises:
   a scheduler configured to store the write transactions;
   an internal buffer configured to store codewords corresponding to the write transactions; and
   an aggregation controller configured to generate the merged transaction according to whether the write transactions corresponding to the burst length are stored in the scheduler.

3. The volatile memory controller of claim 2, wherein the aggregation controller provides a write completion response to the error correction circuit in response to the codewords received from the error correction circuit, wherein the write completion response indicates the write transactions are complete.

4. The volatile memory controller of claim 2, wherein the aggregation controller controls the volatile memory device to perform a flush operation of providing each of the write transactions stored in the scheduler to the volatile memory in response to an event signal generated in the volatile memory.

5. The volatile memory controller of claim 2, wherein, when an address of a write transaction input to the scheduler is not continuous with an address of write transactions stored in the scheduler, the aggregation controller controls the volatile memory device to perform a flush operation of providing each of the write transactions stored in the scheduler to the volatile memory.

6. The volatile memory controller of claim 2, wherein, when a read transaction having a same address as an address of one of the write transactions stored in the scheduler is received, the aggregation controller controls the volatile memory device to perform a flush operation of providing each of the write transactions stored in the scheduler to the volatile memory.

7. The volatile memory controller of claim 2, wherein, when a forced flush request is received from the external host, the aggregation controller controls the volatile memory device to perform a flush operation of providing each of the write transactions stored in the scheduler to the volatile memory.

8. The volatile memory controller of claim 1, wherein addresses of write transactions included in the merged transaction are continuous addresses.

9. The volatile memory controller of claim 1, wherein the burst length corresponds to the number of sequentially decreasing or increasing the address of any one of the write transactions.

10. A storage device, comprising:
    a nonvolatile memory device;
    a main memory configured to temporarily store data related to controlling the nonvolatile memory device; and
    a memory controller configured to control the nonvolatile memory device and the main memory under control of an external host,
    wherein the main memory generates a merged transaction by aggregating a number of write transactions having continuous addresses, among write transactions received from the memory controller, equal to a burst length unit of the main memory, and processes the merged transaction via a burst operation, and
    wherein the burst operation is an operation of storing data while sequentially decreasing or increasing an address of any one of the write transactions included in the merged transaction.

11. The storage device of claim 10, wherein the main memory comprises:
    an error correction circuit configured to generate codewords associated with performing error correction encoding on data corresponding to write transactions included in the merged transaction;
    a data aggregator configured to provide a write complete response based on the generation of the codewords; and
    a main memory device configured to store the codewords.

12. The storage device of claim 11, wherein the data aggregator:
    generates the merged transaction in which write transactions corresponding to the burst length unit are merged; and
    provides the merged transaction to the main memory device via a burst operation.

13. The storage device of claim 12, wherein addresses of write transactions included in the merged transaction are continuous addresses.

14. The storage device of claim 10, wherein the burst length corresponds to a number of sequentially decreasing or increasing the address of any one of the write transactions.

15. The storage device of claim 10, wherein, when a write transaction having a discontinuous address from addresses corresponding to the write transaction is received, the main memory processes each of the write transactions.

16. The storage device of claim 10, wherein, when a forced flush request is received from the memory controller, the main memory processes each of the write transactions.

17. The storage device of claim 16, wherein, when a sleep mode for reducing power consumption of the storage device or a sudden power off occurs, the memory controller provides the forced flush request to the main memory.

* * * * *